United States Patent
Nakagawa (10) Patent No.: US 8,484,540 B2
(45) Date of Patent: Jul. 9, 2013

(54) DATA TRANSMITTING DEVICE, CONTROL METHOD THEREFOR, AND PROGRAM

(75) Inventor: Toshiyuki Nakagawa, Kawasaki (JP)

(73) Assignee: Canon Kabushiki Kaisha, Tokyo (JP)

( * ) Notice: Subject to any disclaimer, the term of this patent is extended or adjusted under 35 U.S.C. 154(b) by 794 days.

(21) Appl. No.: 12/476,154

(22) Filed: Jun. 1, 2009

(65) Prior Publication Data

US 2009/0300455 A1    Dec. 3, 2009

(30) Foreign Application Priority Data

Jun. 3, 2008 (JP) ................................. 2008-146108

(51) Int. Cl.
*H03M 13/00*      (2006.01)

(52) U.S. Cl.
USPC ............................ 714/776; 714/774; 714/820

(58) Field of Classification Search
USPC .......................... 714/776, 774, 820, 821, 746
See application file for complete search history.

(56) References Cited

U.S. PATENT DOCUMENTS

| | | | | |
|---|---|---|---|---|
| 5,446,456 | A  * | 8/1995 | Seo ................................ | 341/118 |
| 5,729,649 | A  * | 3/1998 | Lane et al. ..................... | 386/314 |
| 5,805,762 | A  * | 9/1998 | Boyce et al. ................... | 386/314 |
| 6,910,175 | B2 * | 6/2005 | Krishnamachari ............ | 714/774 |
| 7,117,423 | B2 * | 10/2006 | Kim et al. ..................... | 714/774 |
| 2003/0126238 | A1 | 7/2003 | Kohno | |
| 2007/0223380 | A1* | 9/2007 | Gilbert et al. ................. | 370/235 |

FOREIGN PATENT DOCUMENTS

| | | |
|---|---|---|
| JP | 05-347756 A | 12/1993 |
| JP | 2005-518162 A | 6/2005 |
| JP | 2005-526422 A | 9/2005 |
| JP | 3757857 | 3/2006 |
| WO | 2006/122313 A2 | 11/2006 |

* cited by examiner

*Primary Examiner* — Fritz Alphonse
(74) *Attorney, Agent, or Firm* — Canon USA Inc. IP Division (57) ABSTRACT

A data transmitting device determines a coding rate used to perform error correction coding processing for data transmitted to a data receiving device based on information relating to the function of concealing an error occurring in data transmitted from the data transmitting device, the function being provided in the data receiving device. Then, the data transmitting device performs the error correction coding processing for data transmitted to the data receiving device based on the determined coding rate, and transmits the data subjected to the error correction coding processing to the data receiving device.

19 Claims, 7 Drawing Sheets

DATA TRANSMITTING DEVICE, CONTROL METHOD THEREFOR, AND PROGRAM

BACKGROUND OF THE INVENTION

1. Field of the Invention

The present invention relates to a technology which allows for controlling error correction coding processing performed for data transmitted to a data receiving device based on the quality of transmitted data.

2. Description of the Related Art

In recent years, broadband has been increasingly used in the environment of the Internet due to the widespread use of Asynchronous Digital Subscriber Line (ADSL), Fiber To The Home (FTTH), etc. Further, the processing capabilities of various computing devices including a personal computer (PC) or the like have been significantly increased.

Against the background of the above-described communication environments and the data processing environments with increased capabilities, streaming technologies for distributing multimedia data including video data, sound data, and so forth in real time via a network have become available. Consequently, a user can view a broadband broadcast of a live medium and/or a recorded medium. Further, the user can view the contents of the recorded medium on an on-demand basis.

The quality of service (QoS) technologies assuring the communication speed, the delay time, the jitter amount, the packet loss rate, and so forth, have been used to provide services for which no delay nor suspension is allowed, such as the real time distribution of sound data and/or video data, a picture phone, and so forth.

For example, an error occurring on a network can be corrected through the use of communication-level error correction technologies including the forward error correction (FEC), etc. Further, if an error occurs in the case where MPEG-4 Video is used, the error can be concealed so that the error becomes unobtrusive.

Further, the packet transfer is executed by dynamically switching between the error control achieved through the FEC and that achieved based on retransmission request processing in accordance with the packet loss state and the error occurrence state of the network. Further, a method of increasing the error correction strength of the FEC, only performing the retransmission request processing without performing the FEC, etc. on the transmission side has been proposed (e.g., refer to Japanese Patent No. 03757857).

However, if redundant data is transmitted to correct an error when the error control is performed through the FEC, as in the past, the throughput of the network is decreased. Further, according to the data communication method disclosed in Japanese Patent No. 03757857, no consideration is given to the connection between the error concealment and the FEC. Therefore, final errors that were not corrected through the FEC are concealed through a video decoder, for example. Namely, errors have been separately controlled. Therefore, it has been difficult to achieve both the efficient use of communication bands and the retention of the video quality.

SUMMARY OF THE INVENTION

The present invention allows for retaining the data quality and using the communication band with efficiency.

According to an aspect of the present invention, a transmitting device transmitting at least one video data packet and at least one reconstruction data packet to a receiving device is provided, where the transmitting device includes a receiving unit configured to receive error concealment information transmitted from the receiving device, the error concealment information relating to a function of concealing a reception error of the video data packet, and a control unit configured to control transmission of the reconstruction data packet based on the received error concealment information.

Further features of the present invention will become apparent from the following description of exemplary embodiments with reference to the attached drawings.

DESCRIPTION OF THE EMBODIMENTS

Hereinafter, embodiments of the present invention will be described in detail with reference to the attached drawings.

Figure 1:
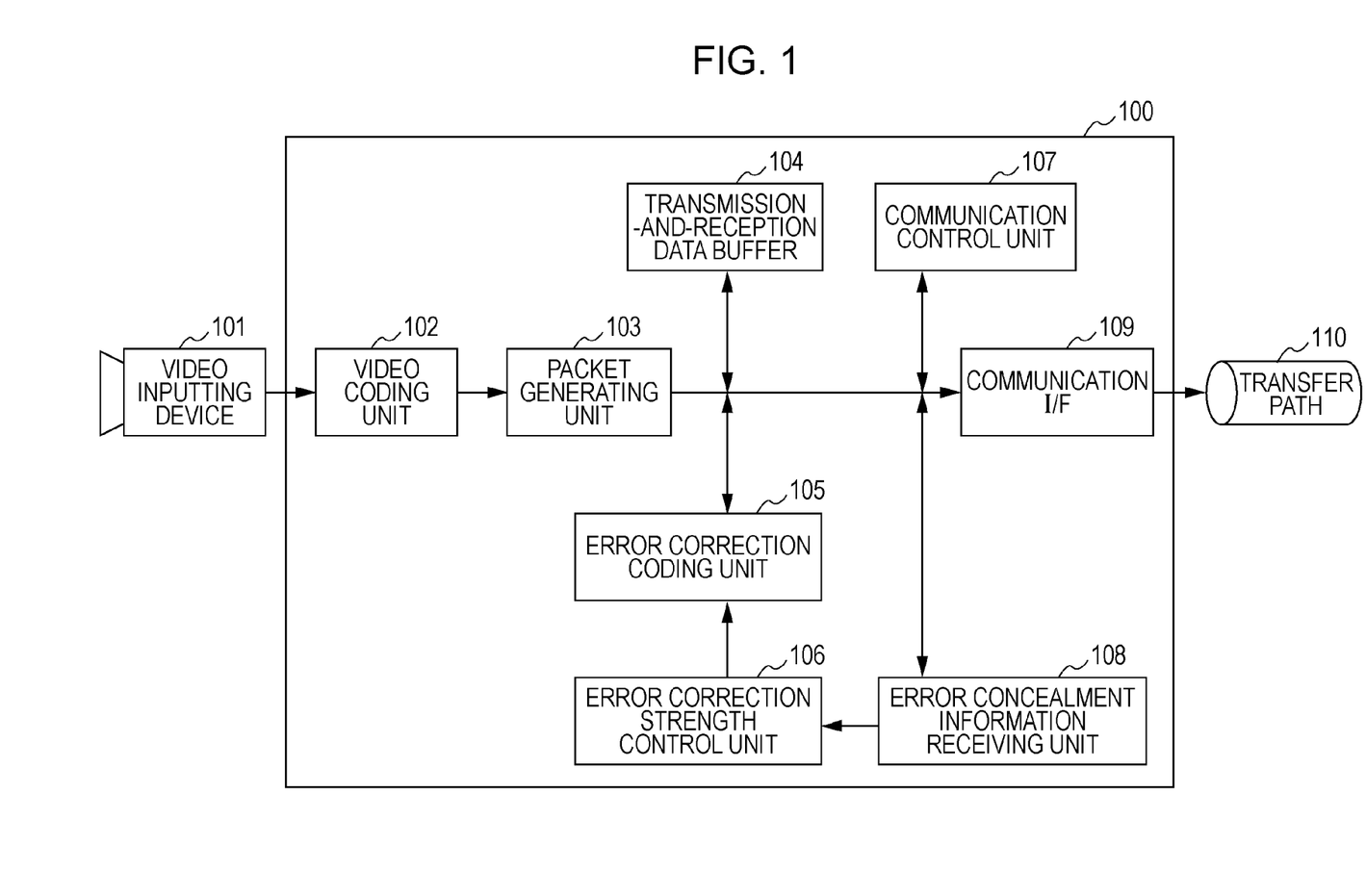
FIG. 1 is a block diagram showing the functional configuration of a data transmitting device.

FIG. 1 is a block diagram showing the functional configuration of a data transmitting device 100 according to an embodiment of the present invention.

As shown in FIG. 1, the above-described data transmitting device 100 includes a video coding unit 102, a packet generating unit 103, a transmission-and-reception data buffer 104, an error correction coding unit 105, an error correction strength control unit 106, and a communication control unit 107. Further, the data transmitting device 100 includes an error concealment information receiving unit 108 and a communication interface 109. The transmission-and-reception data buffer 104 stores data transmitted and received through a storage unit (not shown).

FIG. 1 shows a transfer path 110 including various networks. In the above-described embodiment, the transfer 110 is a network configured to transmit the packet of video data. The video data transmitted and/or received is temporarily stored in the transmission-and-reception data buffer 104. A communication path and/or a protocol used to transmit the video data is controlled by the communication control unit 107.

The video coding unit 102 compresses and codes video data transmitted from a video inputting device 101 including a video camera, a Web camera, and so forth according to the MPEG-4 method. The video data compressed and coded through the video coding unit 102 is transmitted to the packet generating unit 103 in frames.

Each of the frames of the video data transmitted to the packet generating unit 103 is made into a packet and stored in the transmission-and-reception data buffer 104. In the above-described embodiment, MPEG-4 Video is used as the video data coding method. Therefore, the video data is made into a real-time transport protocol (RTP) packet based on Requests for Comments (RFC) 3550 defining the RTP payload format of the video data. The video data packet stored in the transmission-and-reception data buffer 104 is transmitted from the communication control unit 107 to a predetermined destination (data receiving device).

Figure 2:
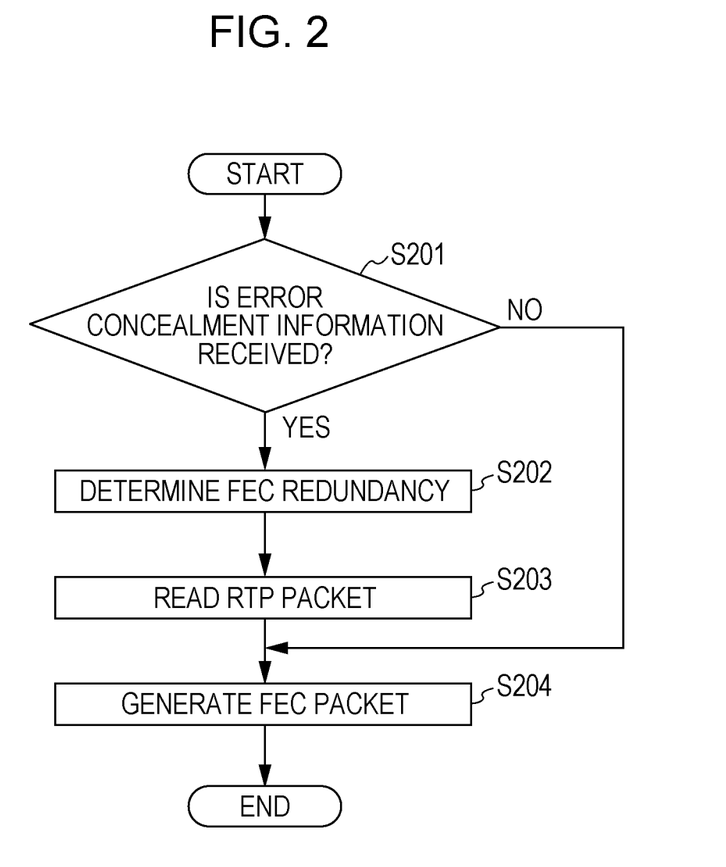
FIG. 2 is a flowchart showing exemplary processing procedures performed to generate an FEC packet in the data transmitting device.

FIG. 2 is a flowchart showing exemplary processing procedures performed to generate an FEC packet in the above-described data transmitting device 100.

First, the error concealment information receiving unit 108 determines whether the error concealment information is received at step S201. If the determination result shows that the error concealment information is not received, the processing is shifted to step S204 so that the FEC packet is generated based on predetermined FEC redundancy. On the other hand, if the error concealment information is received, the error concealment information receiving unit 108 reads the error concealment information from the transmission-and-reception data buffer 104 and transmits the error concealment information to the error correction strength control unit 106. Here, processing performed to receive the error concealment information is exemplary processing performed through a receiving unit according to an embodiment of the present invention.

The error correction strength control unit 106 determines the FEC redundancy based on the transmitted error concealment information at step S202 and notifies the error correction coding unit 105 of the determination result. Here, the error concealment information includes information about whether an error concealment function is provided in a data receiving device that will be described later, and information about parameters relating to the level of the error concealment processing and the quality of video data that had been subjected to the error concealment processing. Step S202 is exemplary processing performed through a determining unit according to an embodiment of the present invention.

For determining the FEC redundancy, the main error processing function provided on the data receiving device side is determined to be the error concealment function when the transmitted error concealment information indicates that the error concealment function is provided on the data receiving device side. Then, a value equal to or less than a value obtained when the error concealment function is not provided on the data transmitting device side is set as the FEC redundancy. Namely, when the FEC redundancy is determined, the coding rate of the error correction coding processing, that is, the FEC redundancy is calculated and set based on information about the level of the error concealment processing function, the information being included in the transmitted error concealment information, and the quality level of video data obtained by using the error concealment processing function. In the above-described embodiment, the data transmitting device stores data of a table with which information about whether the error concealment processing function included in the error concealment function is provided is registered. Further, information about the levels of the error concealment processing functions and the quality levels of video data items obtained by using the error concealment processing function, where the FEC redundancy is associated with each of the levels, is registered with the table. The error correction strength control unit 106 determines the FEC redundancy by referring to the table for the transmitted error concealment information.

Basically, when the level of the error concealment processing function and the quality level of video data obtained by using the error concealment processing function are high, the redundancy is changed in a decreasing direction. On the contrary, when the function level and the quality level are low, the redundancy is changed in an increasing direction. However, the redundancy is set so that when both the function level information and the quality level information are transmitted, the quality level information becomes dominant.

Upon being notified of the FEC redundancy, the error correction coding unit 105 reads a plurality of RTP packets temporarily stored in the transmission-and-reception data buffer 104 based on the above-described FEC redundancy at step S203. Subsequently, the error correction coding unit 105 generates at least one FEC packet based on the RTP packets at step S204. The FEC packet generation is controlled by changing the ratio of the plurality of RTP packets to the FEC packet generated based on the RTP packets in accordance with the FEC redundancy. For decreasing the FEC redundancy, the FEC packet is generated based on an increased number of the RTP packets. On the contrary, for increasing the FEC redundancy, the FEC packet is generated based on a decreased number of the RTP packets. Steps S203 and S204 are exemplary processing procedures performed through a coding unit according to an embodiment of the present invention.

The RTP payload format for the FEC is stipulated in RFC 2733. Therefore, RFC 2733 shall be consulted for the details on the RTP payload format. Further, even though there are methods of using a turbo code, a convolutional code, a block code, and so forth as the method for achieving the FEC, any of the methods can be used for the above-described embodiment. Thus, the FEC packet generated through the error correction coding unit 105 is stored in the transmission-and-reception data buffer 104 and transmitted from the communication control unit 107 to a predetermined data receiving device. The above-described processing is exemplary processing performed through a transmitting unit according to an embodiment of the present invention.

Figure 3:
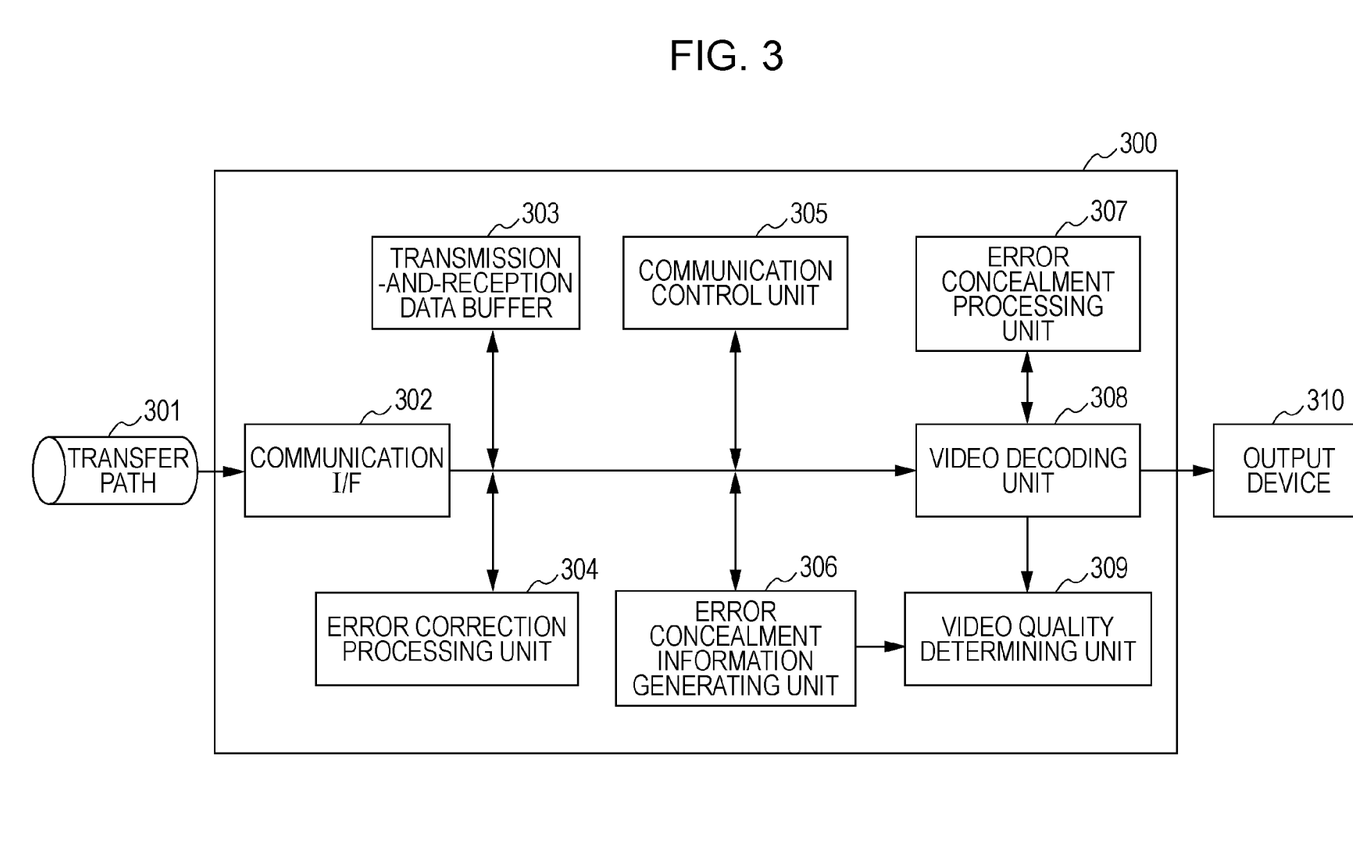
FIG. 3 is a block diagram showing the functional configuration of a data receiving device.

FIG. 3 is a block diagram showing the functional configuration of a data receiving device 300 according to the above-described embodiment. As shown in FIG. 3, the data receiving device 300 includes a communication interface 302, a transmission-and-reception data buffer 303, an error correction processing unit 304, a communication control unit 305, and an error concealment information generating unit 306. Further, the data receiving device 300 includes an error concealment processing unit 307, a video decoding unit 308, a video quality determining unit 309, and an output device 310.

Figure 4:
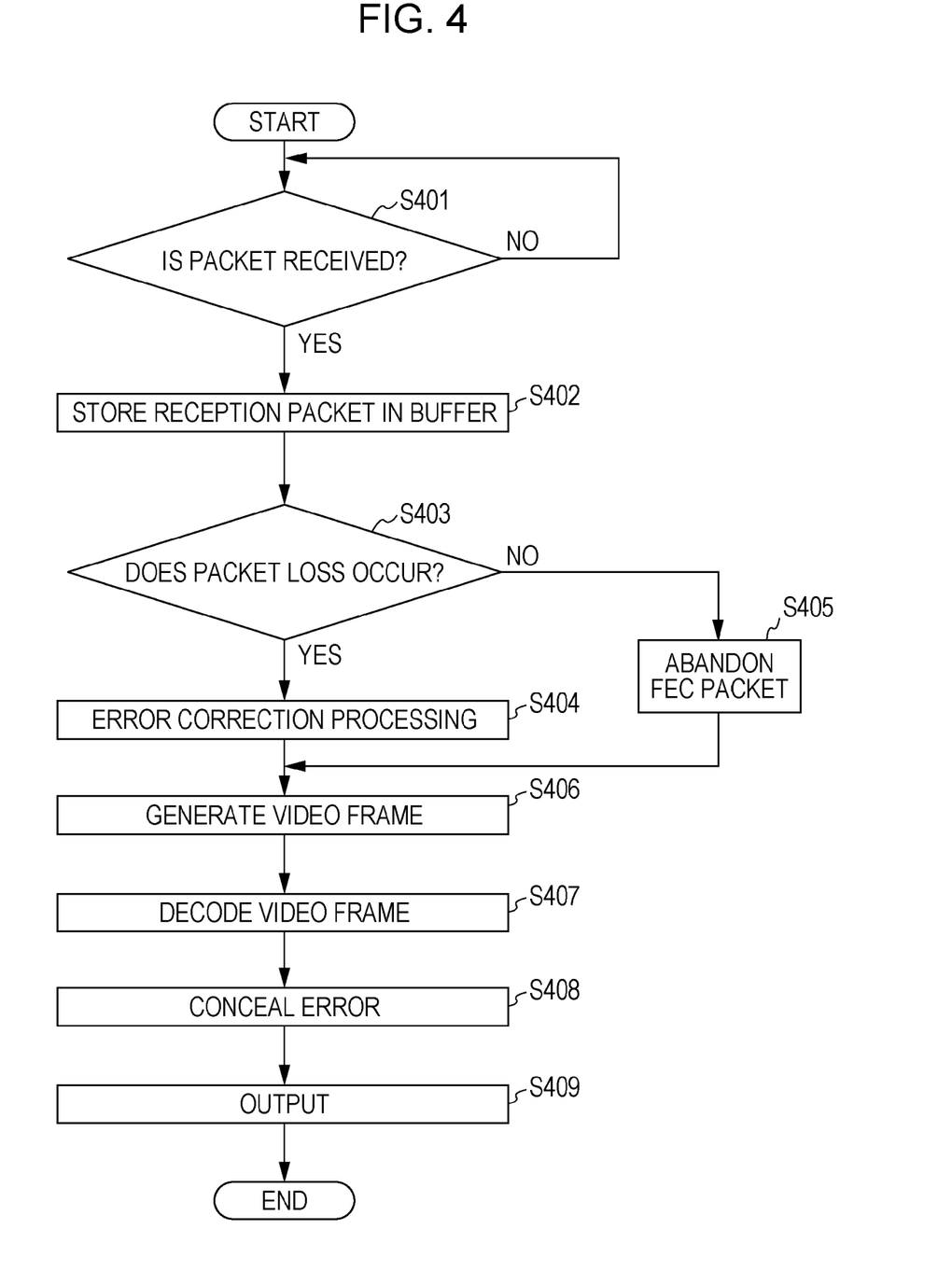
FIG. 4 is a flowchart showing exemplary processing procedures performed to receive a packet in the data receiving device.

FIG. 4 is a flowchart showing exemplary processing procedures performed to receive a packet in the data receiving device 300 according to the above-described embodiment.

Video data transferred via a transfer path 301 shown in FIG. 3 is transmitted to the data receiving device 300 in packets via the communication interface 302. First, in the data receiving device 300, the communication control unit 305 determines whether the packet is received, at step S401. If the result of the determination made at step S401 shows that the packet is not received, the data receiving device 300 waits until the packet is received. Otherwise, the received packet is temporarily stored in the transmission-and-reception data buffer 303 at step S402.

Next, the error correction processing unit 304 determines whether a packet loss occurs at step S403. The above-described determination can be made based on data of a sequence number, the data being recorded as part of the header of each of the RTP packets temporarily stored in the transmission-and-reception data buffer 303. If the sequence numbers are serial values, it is determined that no packet loss occurs. Otherwise, it is determined that the packet loss occurs. In the above-described embodiment, the packet loss is considered to be an error. However, duplicated packets are not considered to be an error and subjected to appropriate processing. For example, one of the duplicated packets is abandoned.

If it is determined that the packet loss occurs at step S403, the error correction processing unit 304 corrects the lost RTP packet through the error correction processing at step S404. Here, an FEC packet relating to the lost RTP packet and an RTP packet used to generate the FEC packet are read from the transmission-and-reception data buffer 303, and the error correction processing unit 304 performs the error correction processing. The RTP packet corrected in the above-described manner is stored in the transmission-and-reception data buffer 303 again.

On the other hand, if it is determined that no packet loss occurs at step S403, the error correction processing unit 304 reads an unnecessary FEC packet from the data temporarily stored in the transmission-and-reception data buffer 303 and abandons the read unnecessary FEC packet at step S405.

Subsequently, at step S406, the error correction processing unit 304 constructs a video frame based on the RTP packets temporarily stored in the transmission-and-reception data buffer 303, that is, the RTP packet received at step S402 and the RTP packet corrected at step S404. Then, the error correction processing unit 304 transmits the video frame to the video decoding unit 308. Since MPEG-4 Video is used as the method of coding video data in the above-described embodiment, the video frame is reconstructed based on an RTP packet which is made into a payload in accordance with RFC 3550 defining the RTP payload format of the video data.

The reconstructed video frame is transmitted to the video decoding unit 308 in predetermined units (usually in frames) and subjected to decoding processing according to a predetermined decoding method at step S407.

Next, at step S408, the error concealment processing unit 307 performs error concealment processing so as to compensate for part of the video frame, the part being left non-decoded at step S407.

In environments where many errors occur, as is the case where a mobile communications network is used, a packet loss corrected with difficulty through the error correction processing performed at step S404 often occurs. In that case, the FEC packet is abandoned from the transmission-and-reception data buffer 303 and the error concealment processing unit 307 performs the error concealment processing.

On the other hand, video data for which the decoding processing had been appropriately finished at step S407 is transmitted to the output device 310 via the error concealment processing unit 307. Further, the method of substituting a similar image searched from prior and subsequent frames for an image in which an error occurs, the method of substituting a similar image searched from the same frame for the image in which the error occurs, etc. can be used as the error concealment processing method.

In the above-described embodiment, the function of displaying the area of the packet of video data which is unsuccessfully received by the receiving device (the occurrence of a packet loss) by using video data of the same frame is referred to as a space-like error concealment function. Further, the function of displaying the area of the packet of the video data which is unsuccessfully received by the receiving device by using video data of a different frame is referred to as a time-like error concealment function.

The video data that had been subjected to the decoding processing and/or the video data that had been subjected to the error concealment processing is transmitted to the output device 310 in units determined based on the specification of the output device 310 (usually in frames) at step S409. The output device 310 includes a display, an accumulation device, a device for transmitting the video data to an arbitrary network, and so forth.

Figure 5:
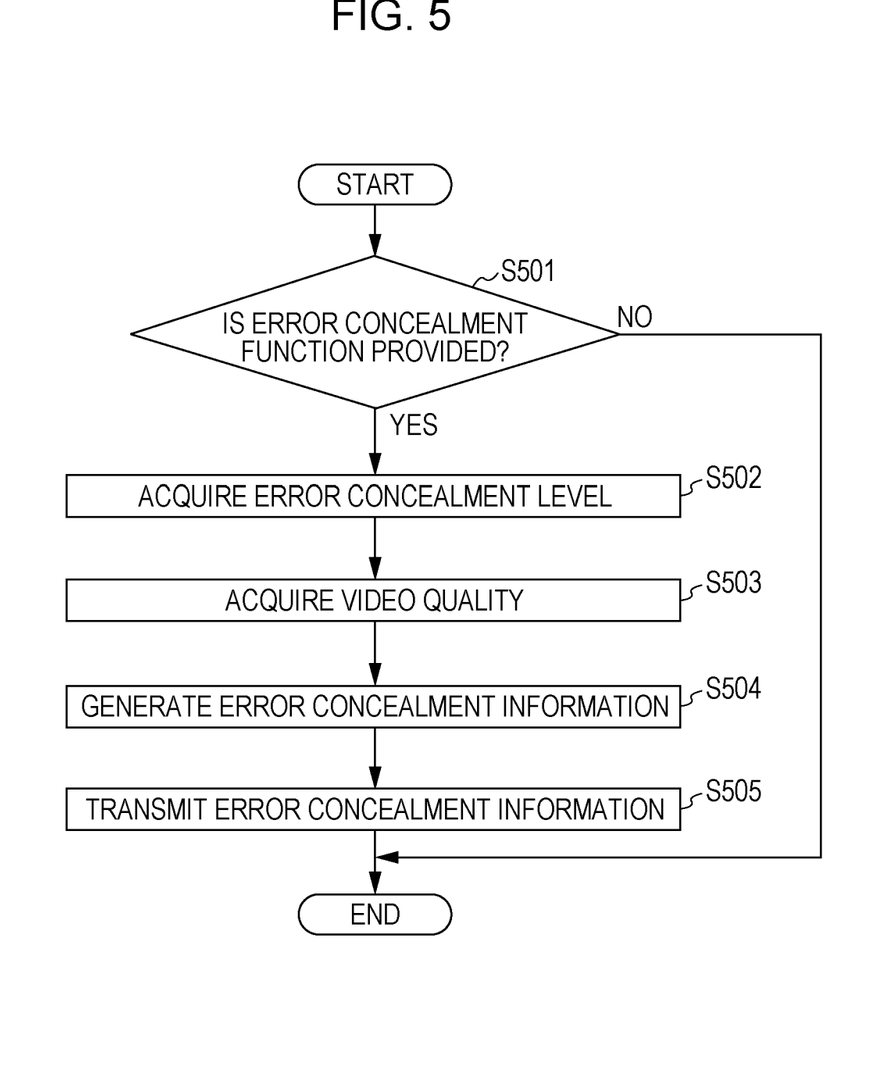
FIG. 5 is a flowchart showing exemplary processing procedures performed to transmit error concealment information in the data receiving device.

FIG. 5 is a flowchart showing exemplary processing procedures performed to transmit the error concealment information in the data receiving device 300 according to the above-described embodiment.

First, in the data receiving device 300, the error concealment information generating unit 306 determines whether the error concealment function is provided at step S501. The above-described determination can be made based on whether the error concealment processing unit 307 is provided and/or whether the video decoding unit 308 is provided with the error concealment function. If the determination result obtained at step S501 shows that the error concealment function is not provided, the data receiving device 300 finishes the processing without transmitting the error concealment information to the data transmitting device 100. On the other hand, if the determination result obtained at step S501 shows that the error concealment function is provided, the error concealment information generating unit 306 acquires information about the level of the error concealment function from the error concealment processing unit 307 at step S502.

Next, the error concealment information generating unit 306 acquires information about the quality of the video data decoded through the video decoding unit 308 and/or the quality of the video data subjected to the error concealment processing through the error concealment processing unit 307 from the video quality determining unit 309 at step S503.

Further, at step S504, the error concealment information generating unit 306 generates the error concealment information based on the error concealment processing function level acquired at step S502 and the video quality acquired at step S503. The error concealment information generated in the above-described manner is stored in the transmission-and-reception data buffer 303 and transmitted from the communication control unit 305 to the data transmitting device 100 which is a predetermined destination at step S505.

Here, the error concealment information used in the above-described embodiment can be transmitted in arbitrary timing. Namely, the error concealment information can be transmitted at predetermined time intervals and/or within a predetermined range relative to the band width of the communication path.

Figure 6:
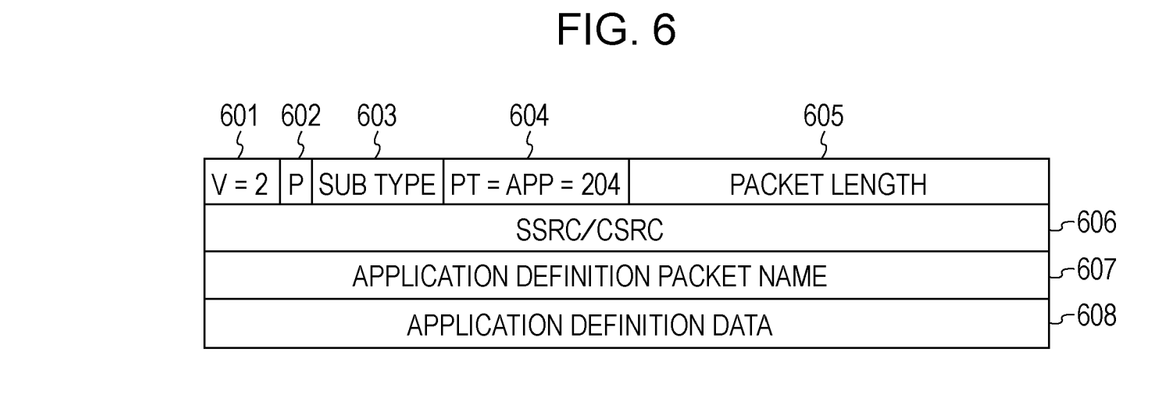
FIG. 6 is a diagram showing the configuration of error concealment information.

Here, exemplary error concealment information will be described with reference to FIGS. 6 and 7. FIG. 6 is a diagram showing the configuration of error concealment information generated through the data receiving device 300 according to the above-described embodiment.

As shown in FIG. 6, the error concealment information used in the above-described embodiment is transmitted and/or received by using an RTP control protocol (RTCP) application defined (APP) packet, for example. The RTCP APP packet is provided so that the function expansion can be defined through an application, and is an RTCP packet defined by an application stipulated by RFC 3550.

In FIG. 6, the sign V601 denotes 2-bit data indicating the protocol version, and data 2 denoting the current RTP version is stored.

The sign P602 denotes 1-bit data indicating a padding bit. When padding data is added to the last data of a packet, data 1 is stored.

A subtype 603 denotes a 5-bit value, and data 0 is stored in the above-described embodiment. The sign 604 indicating the sign PT is 8-bit data indicating the packet type, and data 204 indicating that application definition data is included is stored in the above-described embodiment.

A packet length 605 denotes 16-bit data indicating the length of the RTCP APP packet in bytes.

An SSRC/CSRC 606 denotes a 32-bit identifier provided to identify a person who generates the APP packet.

An application definition packet name 607 denotes a name selected by a person who defines a set of the APP packets, and is interpreted as a 4-byte ASCII character string. In the above-described embodiment, the character string eci or the like is defined as the error concealment information and shared between the data transmitting device 100 and the data receiving device 300. Incidentally, the data transmitting device 100 abandons an APP packet having an unidentifiable name.

Application definition data 608 is variable length data having a length which is a multiple of 32 bits. Therefore, data dependent on an application is stored. In the above-described embodiment, the error concealment information is stored in the area of the application definition data.

Figure 7:
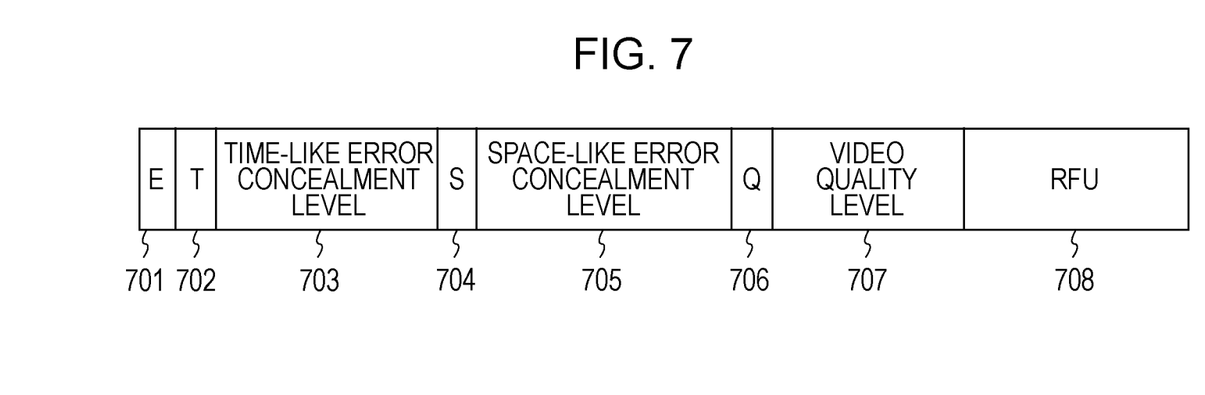
FIG. 7 is a diagram showing the configuration of application definition data of the error concealment information.

FIG. 7 is a diagram showing the configuration of the application definition data 608 of the error concealment information shown in FIG. 6. The sign E701 denotes a 1-bit flag indicating whether the error concealment information is provided. When the data receiving device 300 is provided with the error concealment function, data 1 is stored. Otherwise, data 0 is stored.

The sign T702 denotes a 1-bit flag indicating whether the time-like error concealment function is provided. When the data receiving device 300 is provided with the time-like error concealment function, data 1 is stored. Otherwise, data 0 is stored.

Time-like error concealment level data 703 denotes 6-bit data indicating the level of the time-like error concealment function.

The sign S704 denotes a 1-bit flag indicating whether the space-like error concealment function is provided. When the data receiving device 300 is provided with the space-like error concealment function, data 1 is stored. Otherwise, data 0 is stored.

Space-like error concealment level data 705 denotes 6-bit data indicating the level of the space-like error concealment function.

The sign Q706 denotes a 1-bit flag indicating whether information about the quality level of video data that had been subjected to the error concealment processing is provided. If the above-described video quality level information is included in the error concealment information, data 1 is stored. Otherwise, data 0 is stored.

Video quality level data 707 subsequent to the flag Q706 is 8-bit data indicating the quality level of the video data that had been subjected to the error concealment processing through the error concealment processing unit 307 of the data receiving device 300.

An area 708 shown as "reserved for future use (RFU)" is an 8-bit area reserved for future expansion. Here, the time-like error concealment level data 703, the space-like error concealment level data 705, and the video quality level data 707 indicating the quality level of the video data that had been subjected to the error concealment processing are determined between the data transmitting device 100 and the data receiving device 300.

Figure 8:
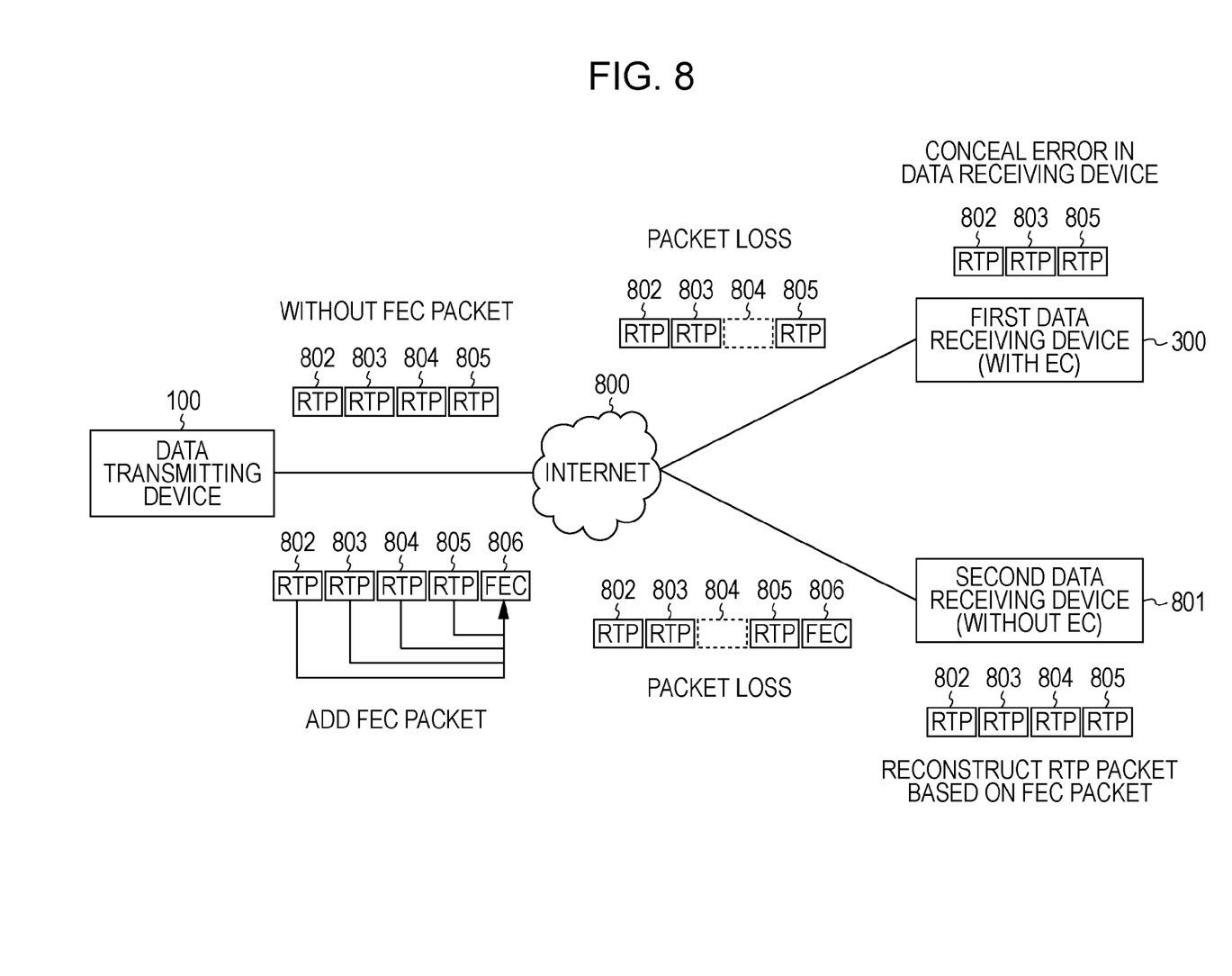
FIG. 8 is a diagram showing an exemplary configuration of a system.

FIG. 8 is a diagram showing an exemplary configuration of the entire system including the data transmitting device 100 and the data receiving device 300 according to the above-described embodiment.

The data transmitting device 100, the first data receiving device 300, and the second data receiving device 801 are connected to one another via an internet 800. Further, the first data receiving device 300 is provided with the error concealment function and the second data receiving device 801 is not provided with the error concealment function.

The error concealment information is not transmitted from the second data receiving device 801 to the data transmitting device 100. In that case, the data transmitting device 100 transmits RTP packets 802, 803, 804, and 805 to the second data receiving device 801, and an FEC packet 806 coded with predetermined redundancy in addition to the above-described RTP packet 802 to 805. In the above-described embodiment, the FEC packet 806 is generated based on the four RTP packets 802 to 805. However, the redundancy is appropriately changed based on the level of the error concealment function of the data receiving device and/or the quality level of the video data that had been subjected to the error concealment processing.

Although the RTP packet 804 is lost on the network, the second data receiving device 801 can recover the RTP packet 804 based on the RTP packets 802, 803, and 805, and the FEC packet 806 that are appropriately transmitted to the second data receiving device 801. Consequently, the video data can be decoded and reproduced appropriately.

On the other hand, the first data receiving device 300 transmits the error concealment information to the data transmitting device 100. The transmitting device 100 receives the error concealment information transmitted from the first data receiving device 300. As a result, the data transmitting device 100 determines that the error can be concealed (the level of the video quality becomes at least equal to a permissible level) through the error concealment function of the first data receiving device 300 even though the RTP packet 804 is lost on the network. Then, the data receiving device 100 transmits only the RTP packets 802 to 805 without transmitting the redundant FEC packet 806.

The first data receiving device 300 receives the RTP packet 804 lost on the network with difficulty. However, the first data receiving device 300 can reproduce the video data by receiving, decoding, and performing the error concealment processing for the RTP packets 802, 803, and 805.

Next, an example where the redundancy is determined based on the level of the error concealment function will be described. As described above, there has been the method of displaying the area corresponding to the video data packet which is lost (unsuccessfully received) by using the similar image searched from the prior and subsequent frames and/or the same frame, as the error concealment processing method. In that case, a search is made for an image similar to a block including the area corresponding to the lost video data packet. Then, the similar image obtained through the search is displayed in the area corresponding to the lost video data packet.

Further, there has been the method of displaying the area corresponding to the lost video data packet by using the image of an area adjacent to the lost video data packet area, as a different error concealment processing method. Still further, there has been the method of interpolating the area corresponding to the lost video data packet for display by using the image pattern of a block including the area corresponding to the lost video data packet, as another different error concealment processing method.

In the above-described embodiment, the method of displaying the area corresponding to the lost video data packet by using the image of an area adjacent to the above-described area in the same frame is determined to be a method with the lowest level of those of the space-like error concealment processing methods.

Further, in the above-described embodiment, the method of interpolating and displaying the area corresponding to the lost video data packet by using the image pattern of the block including the area corresponding to the lost video data packet is determined to be a method with the highest level of those of the space-like error concealment processing methods.

When the level of the space-like error concealment processing of the receiving device is high, the error correction strength control unit 106 determines the FEC redundancy so that the FEC redundancy becomes lower than that obtained when the level of the space-like error concealment processing is low. Namely, when the level of the space-like error concealment processing is high, the error correction strength control unit 106 determines the number of the FEC packets relative to the number of the video data packets (RTP packets) so that the FEC packet number becomes lower than that obtained when the level of the space-like error concealment processing is low. For example, when the level of the space-like error concealment processing is high, a single FEC packet is generated for five video data packets. Further, when the level of the space-like error concealment processing is low, a single FEC packet is generated for three video data packets.

In the above-described embodiment, the method of displaying the area corresponding to the lost video data packet by using the image of the same area provided in the previous frame is determined to be a method with the lowest level of those of the time-like error concealment processing methods.

Further, in the above-described embodiment, the method of displaying the area corresponding to the lost video data packet by using a similar image searched from a different frame is determined to be a method with the highest level of those of the time-like error concealment processing methods.

Then, when the level of the time-like error concealment processing of the receiving device is high, the error correction strength control unit 106 determines the FEC redundancy so that the FEC redundancy becomes lower than that obtained when the level of the time-like error concealment processing is low. Namely, when the level of the time-like error concealment processing is high, the error correction strength control unit 106 determines the number of the FEC packets relative to the number of the video data packets (RTP packets) so that the FEC packet number becomes smaller than that obtained when the level of the time-like error concealment processing is low.

Thus, the FEC redundancy is determined based on the levels of the space-like error concealment processing and the time-like error concealment processing that are performed by the receiving device. Consequently, it becomes possible to use the communication band with efficiency while maintaining the quality of video data for display.

Next, an example where the redundancy is determined based on the quality level of video data that had been subjected to the error concealment processing will be described.

When the quality level of the video data that had been subjected to the error concealment processing is high, the error correction strength control unit 106 determines the redundancy so that the redundancy becomes lower than that obtained when the video quality level is low. Namely, when the quality level of the video data that had been subjected to the error concealment processing is high, the error correction strength control unit 106 determines the redundancy so that a single FEC packet is generated for five video data packets. When the quality level of the video data that had been subjected to the error concealment processing is low, the error correction strength control unit 106 determines the redundancy so that a single FEC packet is generated for three video data packets."

Incidentally, the receiving device can acquire the quality level of the video data that had been subjected to the error concealment processing based on data transmitted from a user, for example.

Further, when a search is made for an image similar to the area of the lost video data packet, the receiving device can acquire the quality level of the video data that had been subjected to the error concealment processing based on the similarity of the searched image.

Thus, the FEC redundancy is determined based on the video quality level of the receiving device. Consequently, it becomes possible to use the communication band with efficiency while maintaining the quality of video data for display.

Thus, the data transmitting device 100 can control the FEC strength of a video stream appropriately based on whether the data receiving device is provided with the error concealment function, the level of the error concealment processing function of the data receiving device, and the quality of video data that had been subjected to the error concealment processing, so as to transmit data. Therefore, the above-described embodiment allows for using the communication band with efficiency while maintaining the video quality.

Further, in the above-described embodiment, the data transmitting device 100 has the function of coding video data. However, the video coding unit 102 and the data transmitting device 100 may be provided as separate devices.

Further, in the above-described embodiment, the MPEG-4 method is used as the method of coding video data, and the Internet Protocol (IP) is used as the network protocol used to perform the coded video data communications. However, without being limited to the MPEG-4 method, similar coding methods provided to code data according to a prediction coding method including the MPEG-2 method, H.264, and so forth can be used as the video data coding method.

In the above-described embodiment, the error concealment processing unit 307 and the video decoding unit 308 are provided as separate devices. However, the video decoding unit 308 may have the error concealment processing function.

Further, the above-described embodiments of the present invention can be implemented through the use of software by using a computer (or a central processing unit (CPU), a microprocessing unit (MPU), etc.) of a system and/or an apparatus. Therefore, a computer program itself supplied and installed in the computer so as to implement the functional processing of the above-described embodiments also constitutes an embodiment of the present invention. Namely, a computer program itself provided to implement the above-described functional processing also constitutes an embodiment of the present invention. In that case, the computer program may be object code, a program executed through an interpreter, a script data supplied to an operation system (OS), and so forth, so long as the computer program has a program function.

A storage medium for supplying the program code may be, for example, a magnetic storage medium including a flexible disk, a hard disk, a magnetic tape, and so forth, an optical/magneto-optical storage medium including a magneto-optical (MO) disk, a compact disk (CD) including a CD-read only memory (ROM), a CD-recordable (R), a digital-versatile disk (DVD), and so forth, and a nonvolatile semiconductor memory such as a nonvolatile memory card.

In that case, the computer program provided to implement the above-described functional processing through a computer is supplied to the computer through the storage medium and/or wired/wireless communications.

The method of using a server provided on the computer network has been used as a method for supplying the program to the computer through the wired/wireless communications. In that case, a data file (program data file) that can be a computer program constituting an embodiment of the present invention is stored in the server. The program data file may be a program for execution and/or source code.

Then, the program data file is downloaded and supplied to a client computer that had accessed the server. In that case, the program data file may be divided into a plurality of segment files so that the segment files are distributed and installed in different servers. Namely, a server device supplying the program data file provided to implement functional processing according to an embodiment of the present invention through a computer to the client computer may constitute an embodiment of the present invention.

Further, it is also possible to distribute storage mediums storing an encoded computer program according to an embodiment of the present invention to users, and supply key information used to decode the encoded computer program to a user satisfying predetermined conditions so that the computer program is installed in a computer of the user. The key information may be downloaded from a home page to the user via the Internet, for example.

Further, a computer program provided to implement the functions of the above-described embodiments through a computer may implement the functions of the above-described embodiments by using the functions of an OS running on the computer. Further, part of or the entire computer program constituting an embodiment of the present invention may be supplied as firmware of an expansion board or the like inserted in the computer so that the functions of the above-described embodiments are implemented through the use of a CPU provided in the expansion board or the like.

While the present invention has been described with reference to exemplary embodiments, it is to be understood that the invention is not limited to the disclosed exemplary embodiments. The scope of the following claims is to be accorded the broadest interpretation so as to encompass all modifications and equivalent structures and functions.

This application claims the benefit of Japanese Patent Application No. 2008-146108 filed on Jun. 3, 2008, which is hereby incorporated by reference herein in its entirety.

What is claimed is:

1. A transmitting apparatus transmitting video data packets to a receiving apparatus, the transmitting apparatus comprising:
 a receiving unit configured to receive error concealment information transmitted from the receiving apparatus, where the error concealment information relates to an error concealment function of displaying an area corresponding to a video data packet which is not received successfully by using a different video data packet;
 a determining unit configured to determine a number of reconstruction data packets relative to a number of the video data packets based on the transmitted error concealment information; and
 a transmitting unit configured to transmit the reconstruction data packets used to reconstruct the video data packet if the video packet is not received successfully according to the number of reconstruction data determined by the determining unit.

2. The transmitting apparatus according to claim 1, wherein a result of the determination made by the determining unit includes that the number of reconstruction data packets is zero.

3. The transmitting apparatus according to claim 1, wherein, when concealment information indicating that the receiving apparatus has the error concealment function is received, the determining unit determines a first number of reconstruction data packets relative to a second number of the video data packets so that the first number of the reconstruction data packets becomes equal to or smaller than a third number of the reconstruction data packets relative to the second number of the video data packets determined when error concealment information indicating that the receiving apparatus has the error concealment function is not received.

4. The transmitting apparatus according to claim 1, wherein, when error concealment information is received, the error concealment information indicating that the area corresponding to the video data packet which is not received successfully is displayed by using an image of an area included in a block corresponding to a block including the area corresponding to the video data packet which is not received successfully, the determining unit determines a first number of the reconstruction data packets relative to a second number of the video data packets so that the first number of the reconstruction data packets becomes smaller than a third number of the reconstruction data packets relative to the second number of the video data determined when error concealment information is received, the error concealment information indicating that the area corresponding to the video data packet which is not received successfully is displayed by using a video data packet of an area adjacent to the area corresponding to the video data packet which is not received successfully.

5. The transmitting apparatus according to claim 1, wherein, when error concealment information is received, the error concealment information indicating that the area corresponding to the video data packet which is not received successfully is displayed through a combination of video data packets of a plurality of areas provided in a block including the area corresponding to the video data packet which is not received successfully, the determining unit determines a first number of the reconstruction data packets relative to a second number of the video data packets so that the first number of the reconstruction data packets becomes smaller than a third number of the reconstruction data packets relative to the second number of the video data determined when error concealment information is received, the error concealment information indicating that the area corresponding to the video data packet which is not received successively is displayed through a video data packet of an area adjacent to the area corresponding to the video data packet which is not received successfully.

6. The transmitting apparatus according to claim 1, wherein the receiving unit receives quality information relating to display quality obtained when the area corresponding to the video data packet which is not received successfully is displayed by using the different video data packet,
 wherein, when quality information indicating first display quality is received by the receiving unit, the determining unit determines a first number of the reconstruction data packets relative to a second number of the video data packets so that a first number of the reconstruction data packets becomes smaller than a third number of the reconstruction data packets relative to the second number of the video data determined when quality information indicating second display quality lower than the first display quality is received.

7. The transmitting apparatus according to claim 6, wherein the quality information is determined based on an evaluation value determined for a display result obtained when the area corresponding to the video data packet which is not received successfully is displayed by using the different video data packet.

8. The transmitting apparatus according to claim 6, wherein the receiving unit receives:
   first quality information corresponding to a plurality of video data packets including a first video data packet; and
   second quality information corresponding to a plurality of video data packets including a second video data packet.

9. The transmitting apparatus according to claim 1, wherein, when error concealment information is received, the error concealment information indicating that an area corresponding to the video data packet which is not received successfully is displayed by using an image of the same area provided in another frame, the determining unit determines a first number of the reconstruction data packets relative to second number of the video data packets so that the first number of the reconstruction data packets becomes smaller than a third number of the reconstruction data packets relative to the second number of the video data determined when error concealment information is received, the error concealment information indicating that an area corresponding to the video data packet which is not received successfully is displayed by using an image corresponding to the area in a different frame.

10. A transmission method performed by a transmitting apparatus transmitting video data packets to a receiving apparatus, the transmitting method comprising the steps of:
    receiving error concealment information transmitted from the receiving apparatus, where the error concealment information relates to a error concealment function of displaying an area corresponding to a video data packet which is not received successfully by using a different video data packet;
    determining a number of reconstruction data packets relative to a number of the video data packets based on the transmitted error concealment information; and
    transmitting the reconstruction data packets used to reconstruct the video data packet if the video packet is not received successfully according to the number of reconstruction data determined at the determining step.

11. The transmitting method according to claim 10, wherein a result of the determination made at the determining step includes that the number of reconstruction data packets is zero.

12. The transmitting method according to claim 10, wherein, when error concealment information indicating that the receiving apparatus has the error concealment function is received, a first number of reconstruction data packets relative to a second number of the video data packets is determined, at the determining step, so that the first number of the reconstruction data packets becomes equal to or smaller than a third number of the reconstruction data packets relative to the second number of the video data packets determined when concealment information indicating that the receiving apparatus has the error concealment function is not received.

13. The transmitting method according to claim 10, wherein, when error concealment information is received, the error concealment information indicating that the area corresponding to the video data packet which is not received successfully is displayed by using an image of an area included in a block corresponding to a block including the area corresponding to the video data packet which is not received successfully, a first number of the reconstruction data packets relative to a second number of the video data packets is determined, at the determining step, so that the first number of the reconstruction data packets becomes smaller than a third number of the reconstruction data packets relative to the second number of the video data determined when error concealment information is received, the error concealment information indicating that the area corresponding to the video data packet which is not received successfully is displayed by using a video data packet of an area adjacent to the area corresponding to the video data packet which is not received successfully.

14. The transmitting method according to claim 10, wherein, when error concealment information is received, the error concealment information indicating that the area corresponding to the video data packet which is not received successfully is displayed through a combination of video data packets of a plurality of areas provided in a block including the area corresponding to the video data packet which is not received successfully, a first number of the reconstruction data packets relative to a second number of the video data packets is determined, at the determining step, so that the first number of the reconstruction data packets becomes smaller than a third number of the reconstruction data packets relative to the second number of the video data determined when error concealment information is received, the error concealment information indicating that the area corresponding to the video data packet which is not received successively is displayed through a video data packet of an area adjacent to the area corresponding to the video data packet which is not received successfully.

15. The transmitting apparatus according to claim 10, wherein quality information is received at the receiving step, the quality information relating to display quality obtained when the area corresponding to the video data packet which is not received successfully is displayed by using the different video data packet,
    wherein, when quality information indicating first display quality is received at the receiving step, a first number of the reconstruction data packets relative to a second number of the video data packets is determined, at the determining step, so that the first number of the reconstruction data packets becomes smaller than the third number of the reconstruction data packets relative to the second number of the video data determined when quality information indicating second display quality lower than the first display quality is received.

16. A storage medium storing a program that can be executed by a computer transmitting a video data packet to a receiving apparatus, the program comprising the steps of:
    receiving error concealment information transmitted from the receiving apparatus, where the error concealment information relates to a error concealment function of displaying an area corresponding to a video data packet which is not received successfully by using a different video data packet;
    determining a number of reconstruction data packets relative to a number of the video data packets based on the transmitted error concealment information; and
    transmitting a reconstruction data packets used to reconstruct the video data packet based on the determination.

17. A transmitting apparatus transmitting at least one video data packet and at least one reconstruction data packet to a receiving apparatus, the transmitting apparatus comprising:

a receiving unit configured to receive error concealment information transmitted from the receiving apparatus, the error concealment information relating to a function of concealing a reception error of the video data packet; and a control unit configured to control transmission of the reconstruction data packet based on the received error concealment information and control a ratio of a number of the reconstruction data packets relative to a number of the video data packets based on the transmitted error concealment information.

18. A transmitting method performed by a transmitting apparatus transmitting at least one video data packet and at least one reconstruction data packet to a receiving apparatus, the transmitting method comprising the steps of:

receiving error concealment information transmitted from the receiving apparatus, the error concealment information relating to a function of concealing a reception error of the video data packet; and controlling transmission of the reconstruction data packet based on the received error concealment information; and controlling a ratio of a number of the reconstruction data packets relative to a number of the video data packets based on the transmitted error concealment information.

19. A storage medium storing a program that can be executed by a computer transmitting at least one video data packet and at least one reconstruction data packet to a receiving apparatus, the program comprising the steps of:

receiving error concealment information transmitted from the receiving apparatus, the error concealment information relating to a function of concealing a reception error of the video data packet; and controlling transmission of the reconstruction data packet based on the received error concealment information; and controlling a ratio of a number of the reconstruction data packets relative to a number of the video data packets based on the transmitted error concealment information.

* * * * *